Patented Nov. 14, 1922.

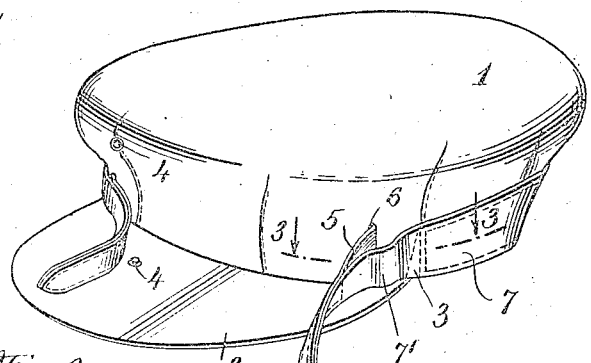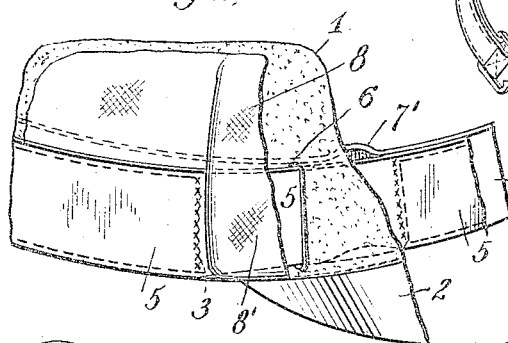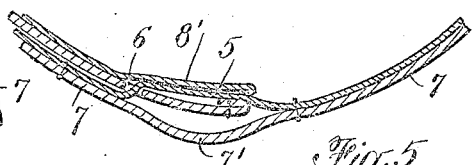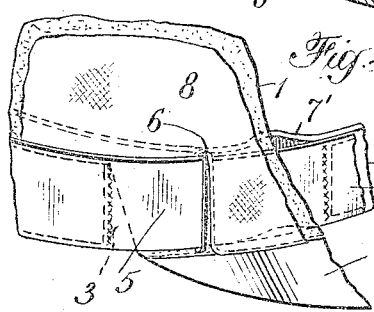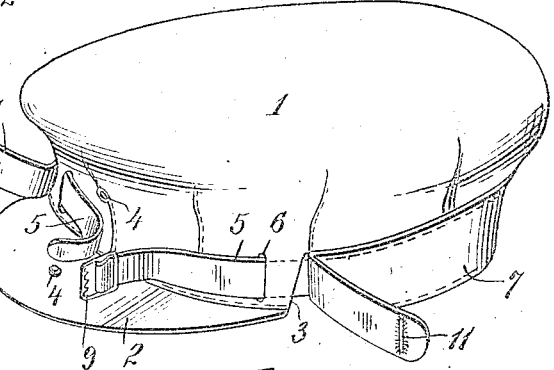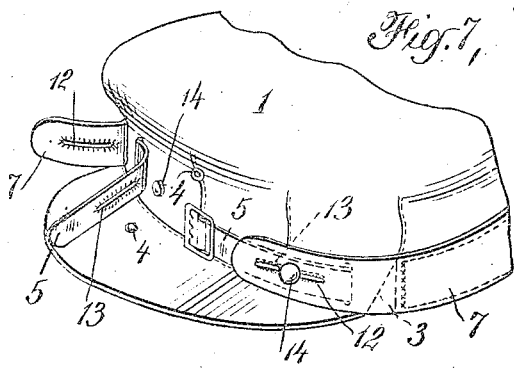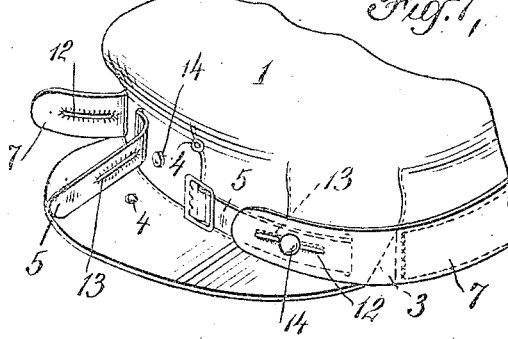

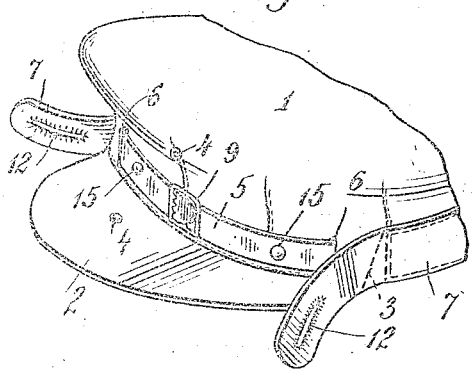
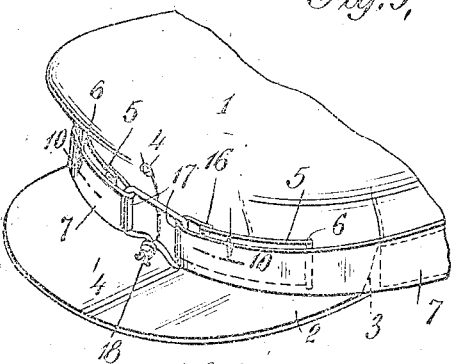
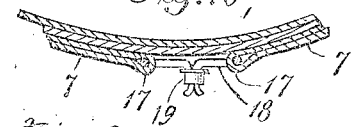
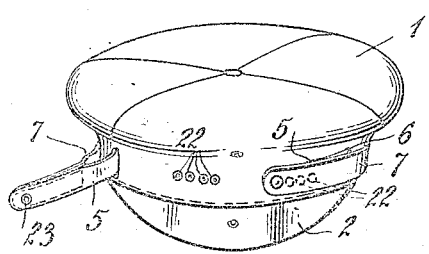
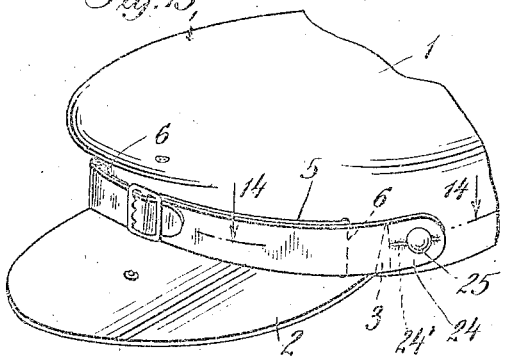
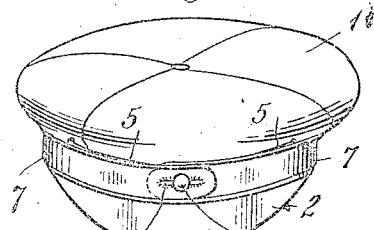
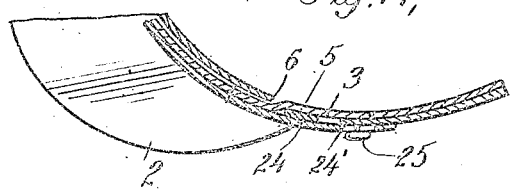
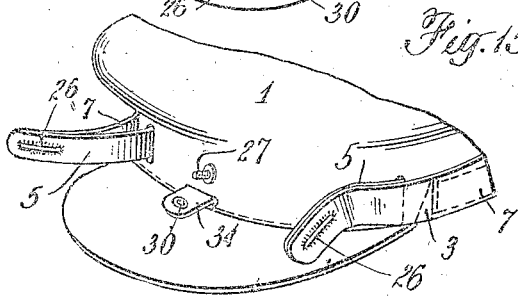
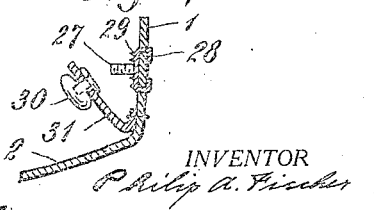

1,435,221

UNITED STATES PATENT OFFICE.

PHILIP A. FISCHER, OF NEW YORK, N. Y.

ADJUSTABLE CAP.

Application filed February 11, 1922. Serial No. 535,849.

*To all whom it may concern:*

Be it known that I, PHILIP A. FISCHER, a citizen of the United States, residing at 409 Edgecombe Ave., New York city, in the county of New York, State of New York, have invented certain new and useful Improvements in Adjustable Caps; and I do hereby declare the following to be a full, clear, and exact description of the invention, such as will enable others skilled in the art to which it appertains to make and use the same.

This invention relates to adjustable caps of the character set forth in my prior Patent No. 1,333,708, dated March 16, 1920, whereby the cap may be quickly and readily adjusted to the desired size. The manifest advantage of adjustable caps is that a manufacturer makes only a single sized cap and so avoids the expense of the extra patterns necessary where more than one size is manufactured.

In my prior patent above referred to, there is a V shaped notch in each side of the cap; a strap of about the width of the notch extends across the notch and conceals it. The straps may be adjusted toward and away from each other, for varying the size of the cap. The straps may be adjustably secured together, or each one may be fastened to the cap in various adjusted positions independent of each other for varying the size of the cap.

With a construction of this kind the strap extending on the outside of the V notch is apt to press the material of the cap into uncomfortable contact with the head of the wearer, and is particularly liable to press the forward vertical edge of the notch against the head so that some discomfort may be produced thereby. The cap according to this invention is designed to avoid any discomfort of this character.

According to this invention the cap is provided with the usual notch on each side; extending on the inside of each notch there is a constricting strap, by which the head size of the cap may be varied, either by adjustably ecuring the constricting straps to each other, or by fastening each constricting strap independently in various adjusted positions. The fact that the constricting strap is on the inside of the notch effectively prevents any discomfort due to the notch and gives a thoroughly comfortable cap. The constricting strap, after it extends across the V notch, on the inside, passes to the outside of the cap through a suitable opening in the front of the body portion of the cap.

In order to complete the cap and in order to cover up the notch in each side of the cap, there is a covering strap extending from the rear of the cap across each V shaped notch, concealing it, around to the front of the cap. It there meets its associated constricting strap, coming out through the opening, and the two straps are engaged with each other as will be described. Each pair of associated straps may be adjusted toward and away from each other, by adjustably securing them together, or by adjustably securing each pair of straps in various positions along the front of the cap, one pair of straps being quite independent of the other pair.

The main adjustment for size of the cap is done by the constricting straps. The covering strap associated with each constricting strap is preferably, although not necessarily, attached thereto so that the covering strap is slightly slack, so that whatever tension is put on the straps will practically all be carried by the constricting straps on the inside of the notch, thereby avoiding any pressure of the edges of the V notch against the head.

The adjustment of the straps may be carried out in a number of different ways and each pair of associated straps may be attached to each other in a number of different ways, all as described more particularly in the drawings. The invention, it should be understood, is not limited to any of the precise forms shown, but is more broadly expressed in the claims, the most important feature of the invention being the use of the two straps on each side of the cap.

Referring now to the drawings which illustrate several modifications, Fig. 1 is a perspective view showing a preferred embodiment of the invention; Fig. 2 is an enlarged view of the inside of the cap looking at the left hand side of the cap, the visor being at the right; Fig. 3 is an enlarged section on the line 3—3 of Fig. 1; Fig. 4 represents a slight modification of the construction shown in Fig. 2; Figs. 5, 6, and 7 are perspective views illustrating a modified means of engaging the straps with each other. Fig. 8 is a modification similar to the modification of Fig. 7; Fig. 9 shows another modification; Fig. 10 is an enlarged section on the line 10—10 of Fig. 9; Fig. 11 shows a modified adjusting device; Fig. 12 is a modification in which the straps on one side of the cap are adjustable independently of the straps on the other side; Fig. 13 shows still another modification; Fig. 14 is a section on the line 13—13 of Fig. 13; Fig. 15 shows still another modification; and Fig. 16 is an enlarged section of a detail of Fig. 15; and Fig. 17 is a slight modification of Fig. 15.

Referring now to the drawings, the body of the cap is indicated at 1, the visor at 2 and the V shaped notch, of which there is one in each side of the cap, at 3. The usual ball and socket fasteners for holding the front of the cap to the visor are indicated at 4. Extending from the rear of the cap across and inside of each V notch, is a constricting strap 5. Each constricting strap extends from the inside of the cap outwardly through an opening 6, one of such openings being provided a short distance in front of each notch. Extending from the rear of the cap there is a covering strap 7, which extends across and on the outside of the V shaped notch and is fastened in any suitable way, such as by sewing, to its adjacent constricting strap 5. This covering strap effectively conceals the notch. The constricting strap 5 and the covering strap 7 are sewed together so that when the constricting strap is tensioned, there is still a slightly slack portion, indicated at 7', in the covering strap. The lining of the cap is indicated at 8 and in the form shown in Figs. 1, 2, 3, it forms a pocket portion 8' into which the constricting strap 5 passes and which covers up the constricting strap while it is on the inside of the cap, that is to say, until it passes out through the opening 6.

The two pairs of associated straps are adjustably secured to each other by any suitable means, such as the buckle 9.

In the modification shown in Fig. 4, the lining 8 is cut away so as to avoid the formation of this pocket, thereby giving a construction which is somewhat cheaper to make. Otherwise, the parts are as shown in Fig. 2.

Referring now to Figs. 5 and 6, a modified means for interengaging the constricting strap and its associated covering strap is there shown. Each covering strap 7 is provided, near one end thereof, with a vertically extending opening 11, about the width of the constricting strap 5, each constricting strap after coming out of its opening 6 passing through the respective opening 11 in its associated covering strap and being adjustably secured to the constricting strap coming from the other side of the cap, by means of a buckle 9 or equivalent means.

In the modification shown in Fig. 7, still another means of interengaging the constricting strap with its associated covering strap is shown. Each of the two constricting straps 5 and each of the two covering straps 7, are provided with elongated buttonholes 12 and 13, respectively, which are adapted to engage over a button 14 attached to the cap. A button 14 is provided for each pair of associated straps, as shown, the elongated buttonholes 12 and 13 allowing for adjustment of the straps. The two constricting straps are adjustably secured together in any suitable way, such as by the buckle 9 or equivalent means.

The modification shown in Fig. 8 is quite similar to that shown in Fig. 7, the difference being that there is a button 15 attached to each of the constricting straps instead of being attached to the cap itself, as shown in Fig. 7. Elongated buttonholes 12 are provided as before for engaging over the buttons 15.

In the modification shown in Figs. 9 and 10, each covering strap 7 is sewed to its associated constricting strap 5, as indicated at 16, thus giving loops 17 through which a cord 18 is engaged, the ends of the cord being engageable with each other by tying them together or being adjustably secured together by a friction clamp 19 of any desired character.

Fig. 11 shows a turnbuckle which may be used for adjusting the ends of the straps with respect to each other.

Fig. 12 is a modification in which each pair of associated straps on one side of the cap may be adjusted quite independently of the other pair. To this end a number of ball elements 22 are provided on each side of the cap, for cooperation with a socket element 23 carried near the ends of each associated pair of straps.

In the modification shown in Figs. 13 and 14 the constricting strap 5 is arranged as in the other figures, the covering strap 24, however, being fastened to the cap at the rear of the notch 3 by a button 25, the strap being provided with a suitable buttonhole 24' for accommodating the button. This strap is evidently readily renewable and the button 25 rather adds to the appearance of the cap.

In the modification shown in Figs. 15 and 16, the two pairs of associated straps are sewed together and are provided with elongated openings 26. A stud 27 is mounted on a base element 28 which is fastened to the cap, such base element being provided with roughenings 29. Each pair of associated straps is adapted to engage over the threaded stud 27 in any desired adjusted position, according to the size of cap desired, and are secured in adjusted position against the roughenings 29 by screwing the nut 30, carried by a tab 31, onto the stud 27. In this modification, the stud 27 is fixed and so there is no liability of its getting off center, as might happen with a buckle.

Fig. 17 shows a modification of Fig. 15, the tab 31 being omitted. Otherwise, the parts are as shown in Fig. 15.

While a number of embodiments of the invention have been illustrated, it should be understood that it is susceptible of other embodiments. The adjustment of the straps may evidently be accomplished in a number of different ways, some of which have been illustrated.

I claim as my invention:

1. An adjustable cap provided with a notch in one side thereof, and further provided with an opening in front of said notch, a covering strap on the outside of said notch, and a constricting strap on the inside of the notch and extending out through said opening into engagement with said covering strap.

2. An adjustable cap provided with a notch in each side thereof, and with an opening in front of each notch, a covering strap extending on the outside of each notch, and a constricting strap extending on the inside of each notch and passing outwardly through respective openings into engagement with the corresponding covering strap, and means interconnecting the two constricting straps for adjusting said straps toward and away from each other for varying the size of the cap.

3. An adjustable cap provided with a notch near one edge thereof, and further provided with an opening in front of said notch, said opening being covered by the lining of said cap which forms a pocket, a covering strap on the outside of said notch, a constricting strap on the inside of said notch and extending through said pocket and said opening, means for interengaging the straps with each other, and means for adjusting both straps for varying the size of the cap.

In testimony whereof I affix my signature.

PHILIP A. FISCHER.